May 2, 1933.  F. E. HAWORTH  1,907,105
MAGNETIC TESTING
Filed Sept. 30, 1930   2 Sheets-Sheet 1

INVENTOR
F. E. HAWORTH
BY J. W. Schmied
ATTORNEY

May 2, 1933.   F. E. HAWORTH   1,907,105
MAGNETIC TESTING
Filed Sept. 30, 1930   2 Sheets-Sheet 2

INVENTOR
F. E. HAWORTH
BY
ATTORNEY

Patented May 2, 1933

1,907,105

UNITED STATES PATENT OFFICE

FRANCIS E. HAWORTH, OF SUMMIT, NEW JERSEY, ASSIGNOR TO BELL TELEPHONE LABORATORIES, INCORPORATED, OF NEW YORK, N. Y., A CORPORATION OF NEW YORK

MAGNETIC TESTING

Application filed September 30, 1930. Serial No. 485,570.

The present invention relates to testing apparatus and particularly to apparatus for testing and measuring the properties of magnetic materials.

An object of the invention is to provide means for quickly and accurately ascertaining the properties of magnetic materials.

A further object of the invention is to provide a method of and apparatus for readily and accurately tracing magnetization and hysteresis curves of magnetic materials.

Various apparatus and measuring systems have been proposed heretofore for obtaining magnetization curves and hysteresis curves of magnetic materials. For instance, it has been customary to wind two coils on a sample of the material to be tested, one coil being connected to a source of current supplying the current for producing a magnetizing force and the other being connected to a ballistic galvanometer. As the magnetizing force is changed in small steps, the galvanometer needle deflects proportionally to the change in flux. In this manner it is possible, by taking a large number of readings, to obtain a series of disconnected points enabling the plotting of magnetization or hysteresis curves. This procedure, however, is tedious, time consuming and inaccurate.

A somewhat more rapid method of tracing magnetic curves has been described by J. A. Ewing in "Magnetic Induction in Iron and other Metals", pages 118 to 123, third edition, 1900. However, this method is applicable only to specimens having the form of bars or laminations. The Braun tube hysteresigraph described in U. S. Patent 1,574,350, February 23, 1926, to J. B. Johnson, has the disadvantage of introducing eddy current effects in the curves drawn.

In accordance with the present invention a continuous and accurate magnetic curve, such as a magnetization or hysteresis curve, is traced directly by a beam of light on a sheet of light-sensitive paper mounted on a drum revolving at such a speed that the distance, by which any point on the sheet of paper moves to the right or left of an arbitrary line parallel to the axis of rotation of the drum is proportional to the variation of the magnetizing force, while the beam of light which is reflected from the mirror of a deflecting fluxmeter deflects at right angles to the direction of travel of the paper by amounts proportional to the total flux produced in the sample by the varying magnetizing forces.

The invention will be more readily understood from the following description and accompanying drawings in which.

Figure 1:
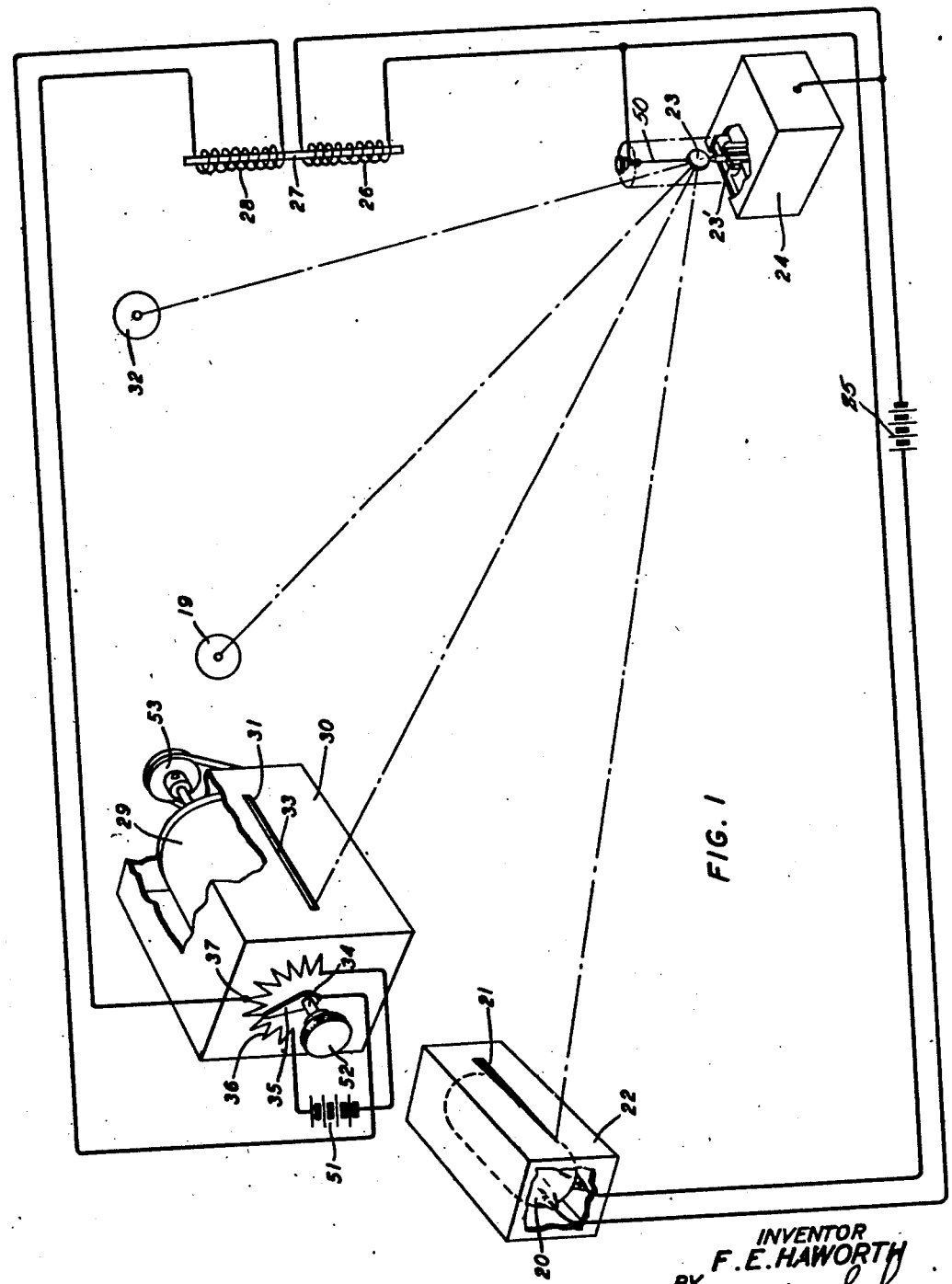
Fig. 1 depicts in a schematic manner one embodiment of circuit arrangements and apparatus.

In Fig. 1 an elongated light sensitive cell 20 is mounted behind a V-shaped slot 21 of an opaque enclosure or box 22 in such a manner that light emanating from the light source 32 and reflected by the mirror 23 fastened to the moving coil 23' of the fluxmeter 24 falls upon the cell. The cell 20, in series with a battery 25, is connected to the fluxmeter 24 in parallel with the secondary winding 26 of the specimen 27. The current induced in the secondary winding of the specimen by the change in magnetizing force caused by the change in intensity of the current flowing in the primary winding 28 tends to deflect the mirror of the fluxmeter. Current flowing in the circuit of battery 25 is proportional to the amount of light falling on the light-sensitive cell which amount, because of the wedge-shaped opening, is proportional to the deflection of the fluxmeter mirror. The voltage of battery 25 is adjusted to such a value that if the light beam is at rest when at the apex of the slit; at any other position, the current passing through the cell will develop a torque in the fluxmeter coil which just balances the restoring torque of the suspension 50 of the fluxmeter. Since the restoring torque and the amount of induced current are both proportional to the deflection, the restoring torque is neutralized for all deflections and the fluxmeter deflections are directly proportional to the changes of flux occurring within the secondary winding 26 under the influence of changes in magnetizing force of the primary winding 28.

In order to register the fluxmeter deflections and to vary the magnetizing force exerted by the primary winding 28, a drum 29 wound with photographic paper is placed in a light tight box 30 having a long, narrow slit 31 parallel to the axis of rotation of the drum. A beam of light emanating from light source 19 is reflected by the fluxmeter mirror, focused on the slit 31 and brought to a fine point by means of a lens 33 inserted in the slit 31. This beam is reflected by the same fluxmeter mirror 23 which reflects the beam onto the photoelectric cell, the two beams being incident at different angles. Attached to the shaft 34 of the drum is an arm 35 which slides along a rheostat 36. Battery 51 supplies the magnetizing current for the primary winding; it is connected across the rheostat 36 and a center tap 37 is soldered to the rheostat. Between the arm and the center tap a varying E. M. F. is produced which is applied to the primary or field coil 28. This E. M. F. reverses its sign every time the arm 35 slides past the center of the rheostat, and the latter is curved in a manner calculated so that the variation of the field current will be proportional to the angle of rotation of the drum from the center position. When the drum 29 is rotated it moves the photographic paper past the slit 31 so that the distance moved is proportional to the variation of the field current. The rotation of the drum 29 thus causes a corresponding variation of the magnetizing force exerted by the primary coil 28. A current is thus induced in the secondary coil 26, causing a deflection of the fluxmeter mirror 23. The fluxmeter mirror deflects the beam of light emanating from 32 along the slit 31. This deflection is proportional to the time integral of the changes of flux within the specimen. A curve with rectangular axes is thus registered on the photographic paper; the abscissa of this curve which is parallel to the direction of rotation of the drum may be calibrated in terms of magnetizing force and the ordinate which is parallel to the axis of the drum may be calibrated in terms of flux density. While the drum 30 may be rotated by hand, by means of knob 52, it is preferably rotated by an electric motor of constant speed (only the pulley 53 is shown) geared down to about 1 revolution in two minutes, in order to insure a constant rate of rotation of the drum during the tracing of a curve.

Figure 2:
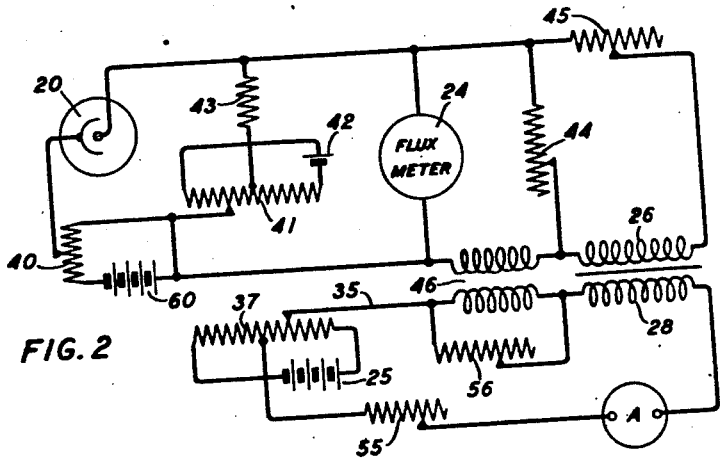
Fig. 2 shows the electrical circuits in more detail.

Fig. 2 shows the electrical circuits in detail. 37 represents the rheostat controlling the field current and 35 the arm which rotates with the drum 29 of Fig. 1. The battery 25 supplies the magnetizing current. The battery 60 furnishes the E. M. F. for the photoelectric cell 20, the value of potential applied to the latter being regulated by an adjustable resistance 40 not shown in Fig. 1. The potential divider 41 and dry cell 42, in series with a resistor 43 having a resistance of about 10 megohm, are provided for the purpose of balancing out thermo-electric potentials and currents from the photo-electric cell due to stray light. The resistances 44 and 45 are adjusted according to the amount of flux already in the specimen at the beginning of the test in order to start the deflection of the fluxmeter from the correct value. The mutual inductance 46, the current in the primary of which is adjustable by resistor 56, balances out potentials produced in the secondary coil 26 when no specimen is within it, thereby making the deflection of the fluxmeter 24 proportional to the change in flux density as a function of varying magnetizing forces. Resistor 55 serves to regulate the maximum magnetizing current to which it is desired to subject the sample under investigation. Ammeter A measures the value of the magnetizing current at any particular time.

Figs. 3 to 6 depict reproductions of actual hysteresis loops traced by an apparatus in accordance with the present invention. In these curves, the magnetizing forces, shown as abscissæ, were varied from a maximum negative value of 10 gauss to a maximum positive value of 10 gauss. The ordinates representing flux densities are shown on different scales.

Figure 3:
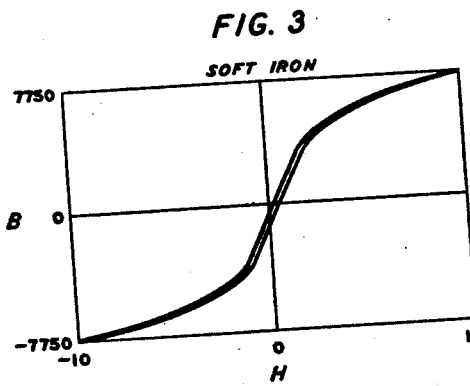
Figs. 3 to 6 show reproductions of hysteresis loops of various magnetic materials which were traced by an apparatus in accordance with the invention.

The material investigated and charted in Fig. 3 was very soft iron (about 0.15% carbon). It may be seen that the hysteresis loop, although very narrow, is regular and continuous. The maximum flux density for the magnetizing force used was 7750 gauss.

Figure 4:
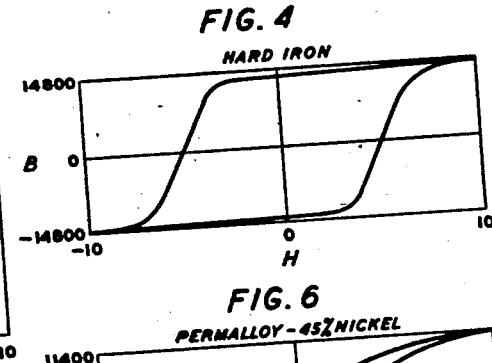

Fig. 4 shows a similar hysteresis loop for a different material, namely, hard iron of a carbon content of about 0.80%. This hysteresis loop is rather wide, showing that this material has a tendency to retain all the magnetism induced in it. The maximum induction was 14800 gauss.

Figure 5:
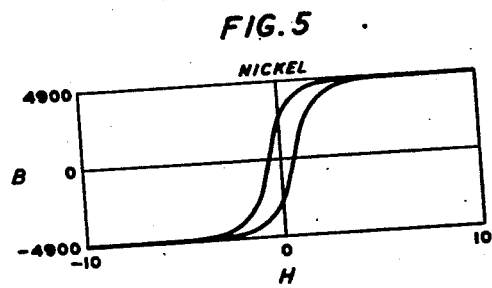
Figure 6:
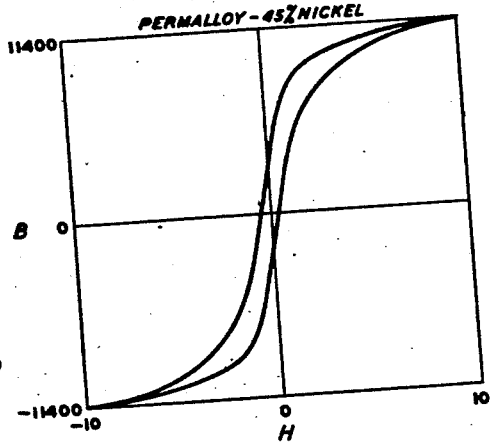

Figs. 5 and 6 show hysteresis loops for nickel and for one of the alloys known as permalloy containing 45% nickel and the balance iron, respectively.

What is claimed is:

1. In a device for measuring variations in magnetic flux, rotatably suspended means, the suspension being subjected to torsion and to a tangential restoring force when traversed by an electrical current and means for counter-balancing the restoring torque of the suspension for all angles of deflection.

2. Device in accordance with claim 1 further characterized in this that the counter-balancing means comprise an electrically conductive path the conductivity of which is proportional to the flow of current in the rotatable means.

3. In combination, primary and secondary windings, a source of current for said primary winding, two sources of light, a deflecting light reflector reflecting two discrete beams of light the angles of deflection of which are proportional to the current induced in the secondary winding under the influence of changes in the flow of current in said primary winding.

4. A magnetic testing device comprising rotatable suspended means responsive to variations of magnetic flux, means for integrating variations in flux density as functions of varying magnetizing forces, comprising means for effectively compensating the restoring torque of the suspension for all angles of rotation.

5. In a device for integrating and graphically recording changes in magnetic flux comprising a suspended mirror type electrical indicating instrument deflected by changes in magnetic flux, a beam of light incident upon said mirror, means for counterbalancing the restoring torque of the suspension of said mirror comprising an electrically conductive path whose conductivity is a function of the amount of light falling thereupon from the suspended mirror.

6. In a magnetic curve tracer, primary and secondary windings adapted to surround a test sample, adjustable means adapted to subject the sample to a varying magnetizing force, means rotating an amount proportional to the variations of said magnetizing force, means rotating an amount proportional to the current induced in the secondary winding, deflecting means integral with said second mentioned rotating means and a beam of light reflected by said deflecting means for recording the deflection upon said first mentioned rotating means.

7. The method of ascertaining the variations in flux with magnetizing force of a body of magnetic material by means of apparatus including a deflectable reflector suspended so that departures from its normal position tend to set up a variable restoring torque which includes the steps of inducing a magnetic flux in the sample by means of an electric current, inducing an electric current by means of the magnetic flux, deflecting the reflector in accordance with the induced current and counterbalancing the restoring torque for all deflections of said reflector.

In witness whereof, I hereunto subscribe my name this 29th day of September 1930.

FRANCIS E. HAWORTH.